No. 853,346. PATENTED MAY 14, 1907.
H. EGGERS.
ORE FEEDER.
APPLICATION FILED APR. 10, 1906.
3 SHEETS—SHEET 3.
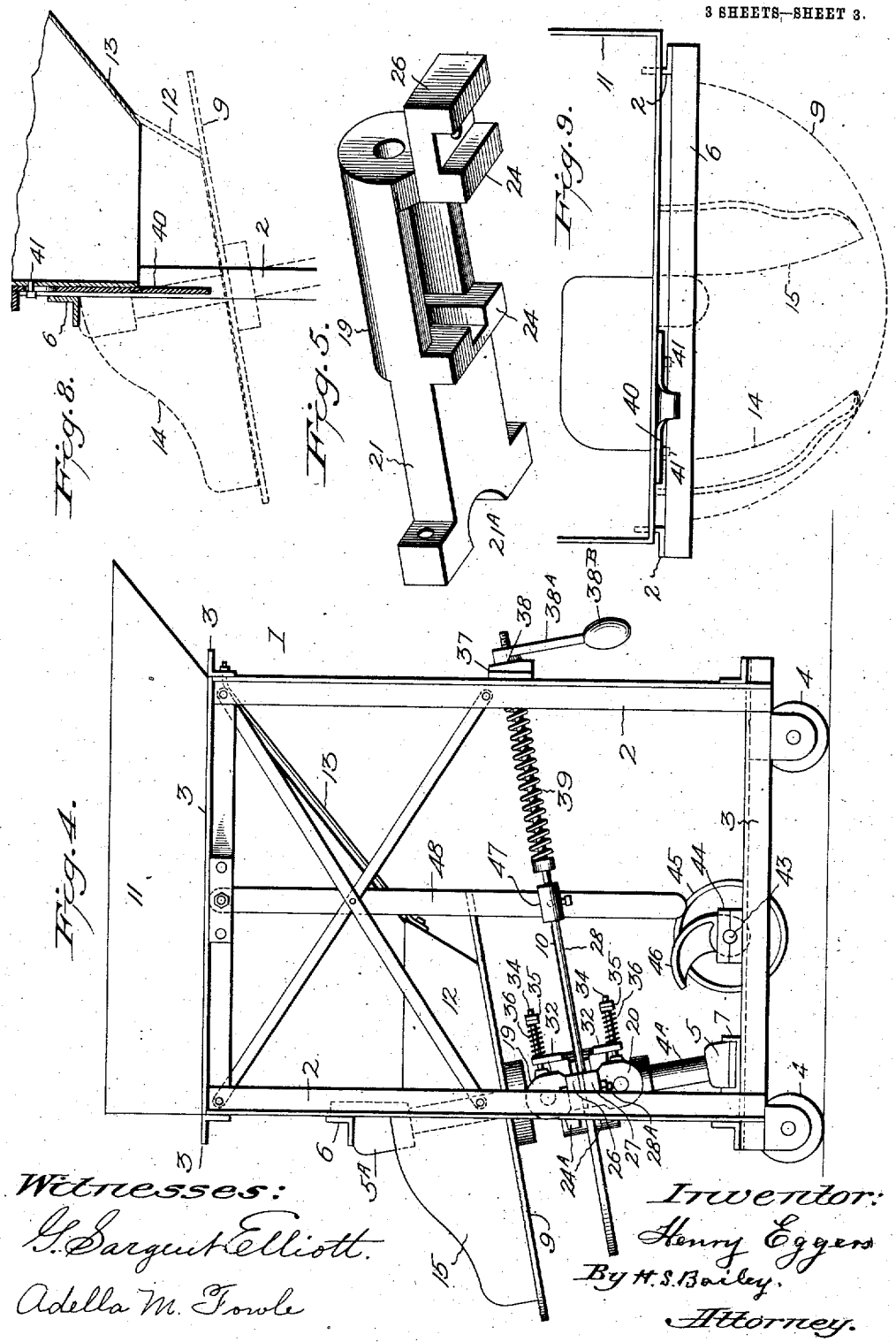
Witnesses:
G. Sargent Elliott.
Adella M. Fowle
Inventor:
Henry Eggers
By H. S. Bailey.
Attorney.

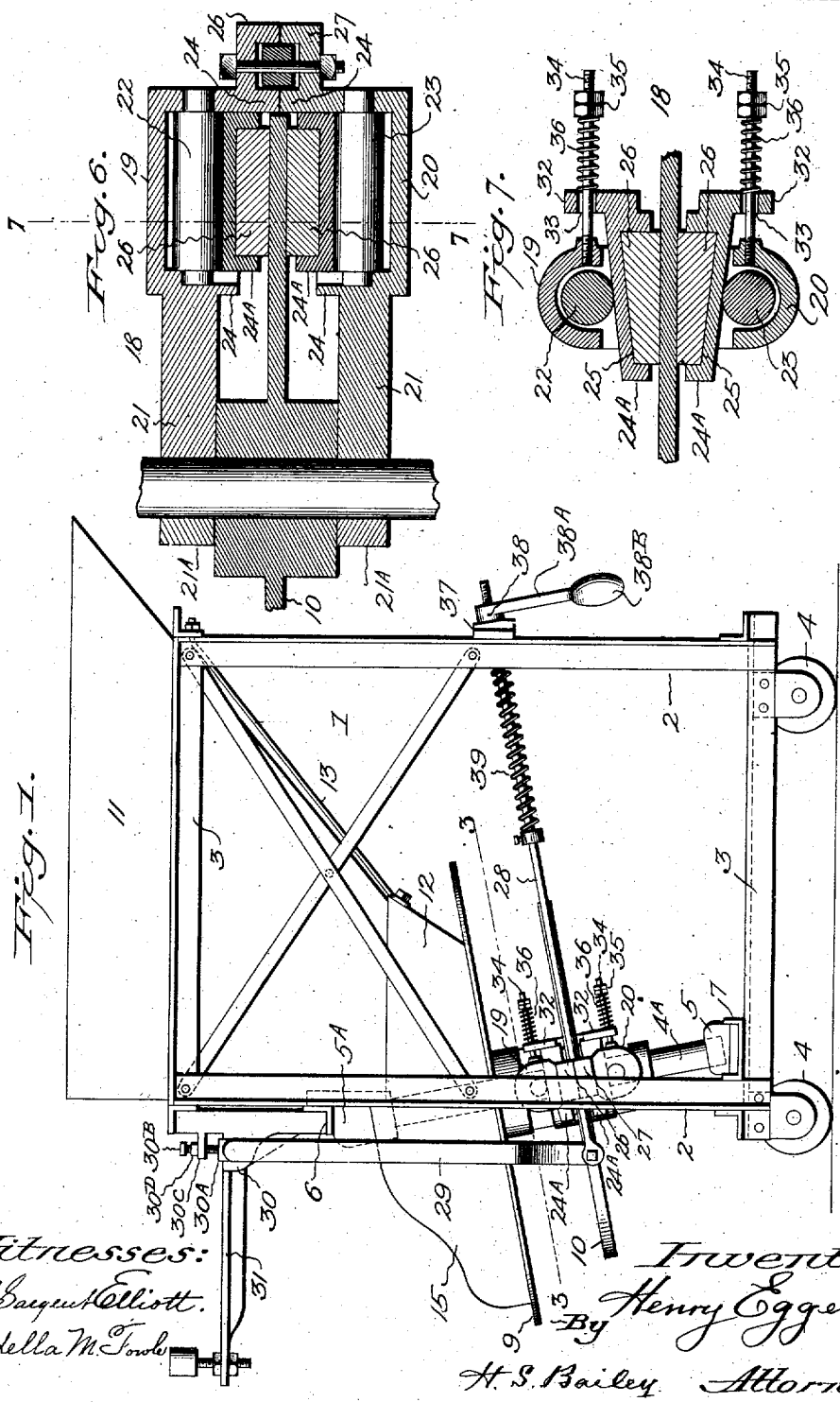

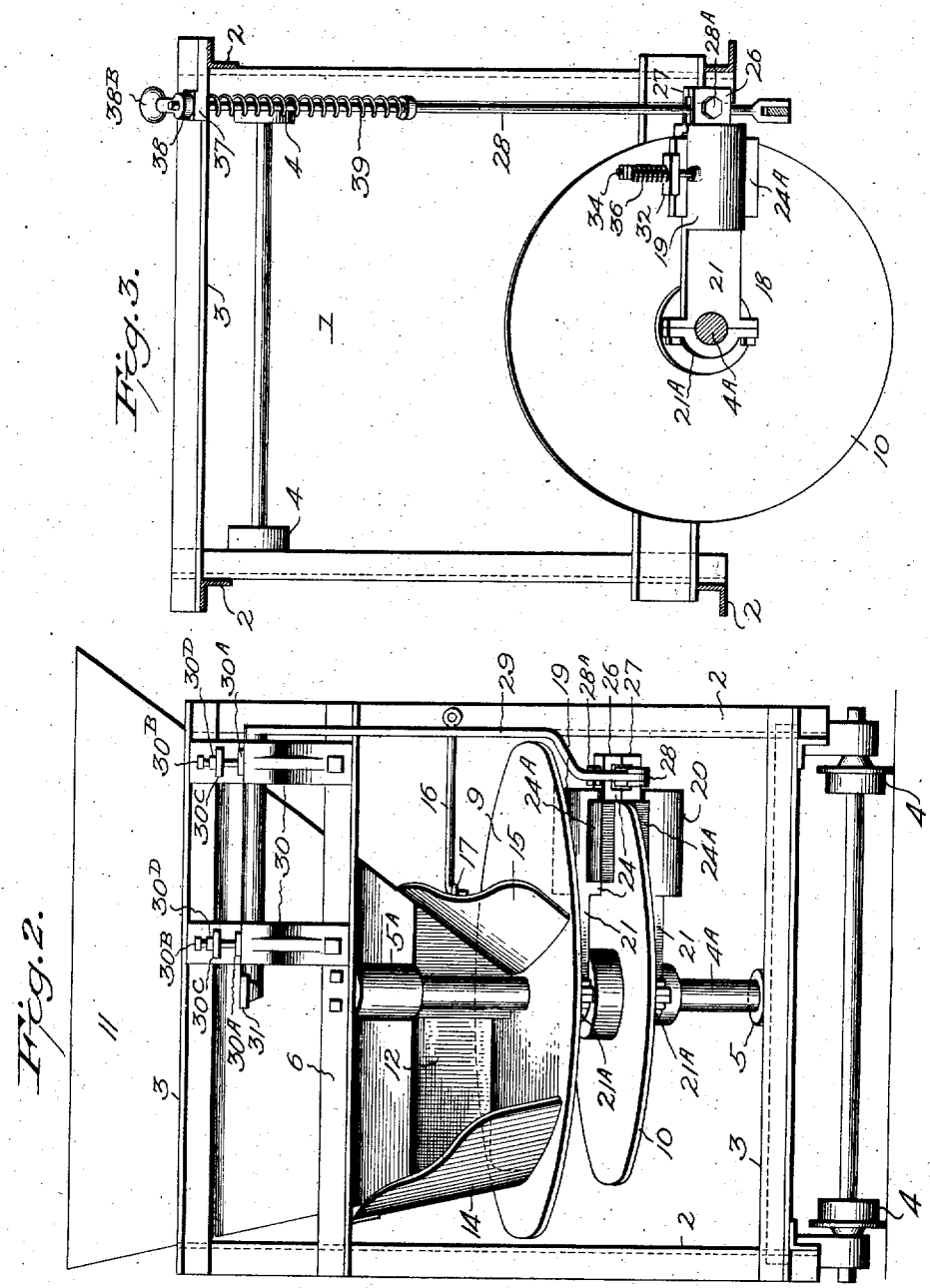

UNITED STATES PATENT OFFICE.

HENRY EGGERS, OF DENVER, COLORADO.

ORE-FEEDER.

No. 853,346.  Specification of Letters Patent.  Patented May 14, 1907.

Application filed April 10, 1906. Serial No. 310,956.

*To all whom it may concern:*

Be it known that I, HENRY EGGERS, a citizen of the United States of America, residing at the city and county of Denver and State of Colorado, have invented a new and useful Ore-Feeder, of which the following is a specification.

My invention relates to improvements in ore feeders, and the object of my invention is: to provide a frictional grip ore feeder for feeding lump ore from rock breakers to stamp mills, granulators, and pulverizing machines, in concentrating and other ore treating mills. I attain this object by the mechanism illustrated in the accompanying drawings, in which:

Figure 1, is a side elevation of my improved ore feeder arranged to be operated by the tappet of a stamp mill. Fig 2, is a front view thereof, the gate for regulating the feed of the ore being omitted. Fig. 3, is a horizontal section on the line 3—3 of Fig. 1. Fig. 4, is a side elevation of the feeder arranged to be operated by a cam. Fig. 5, is a perspective view of one of the roller boxes. Fig. 6, is a vertical, sectional view through a portion of the friction disk, and mechanism for operating the same. Fig. 7, is a sectional view on the line 7—7 of Fig. 6. And Figs. 8 and 9, are views illustrating a gate for regulating the feed of the ore.

Similar letters of reference refer to similar parts throughout the several views.

Referring to the drawings, the numeral 1, in general, designates the frame of my improved ore feeder. This frame is preferably composed of vertically and horizontally arranged angle irons 2 and 3, and the lower portion of the frame is provided with rollers 4, by which it may be easily moved. A vertical shaft 4$^A$, is journaled in boxes 5 and 5$^A$, which are secured to the cross pieces 6 and 7, of the front end of the machine. This shaft is placed at a slightly forward angle to the vertical corner posts 2, of the frame, and two disks 9 and 10, are secured to it. These disks are placed at a short distance apart. The upper disk 9, is made of a diameter that will fill but rotate within the front corner standards 2, and a hopper 11, is mounted in the top of the frame, the bottom of which slopes from the rear end of the frame toward the front end of the frame, and terminates in a flat discharge spout outlet 12, the bottom of which rests close to the top surface of the feed disk 9. This hopper is preferably made in two parts, the hopper proper 11, and its discharge outlet 12. The hopper is preferably constructed of sheet iron, but its discharge outlet is preferably a casting. The hopper rests on the top cross pieces 3, of the frame, and the discharge spout is secured at its front end to the cross piece 6, and a bolt 13, extends from its rear end to the upper rear cross piece, and is bolted to it, and as the face of the disk is inclined or sloped outward and downward from the frame, the bottom of the discharge spout is also beveled to fit all around almost in contact with it. The front end of this discharge spout as well as its bottom, is open, and on the opposite sides of its open end guide plates 14 and 15, are placed.

The guide plate feeder 14, is secured to the discharge chute 12. This guide plate is curved to direct the discharging ore to the central portion of the feed disk. The guide plate 15, is secured at its rear end to the discharge chute, and is braced against rotative feed movement of the feed disk by a hook 16, which is pivotally secured to the adjacent end standard of the frame at one end, and hooks into an eye 17, secured to the back of the guide plate. This plate is also curved to guide the ore to the central portion of the discharging edge of the feed disk. The lower disk 10, is the frictional feed disk. It is preferably made somewhat smaller in diameter than the feed disk 9, and to one side edge of it I attach a step by step frictional grip device, which in general I will designate by the numeral 18, but which is composed of two similar half boxes 19 and 20, each of which is provided with an arm 21, that extends to and is loosely journaled to the shaft 4$^A$, on opposite sides of the disk 10, by means of journal boxes 21$^A$. These boxes 19 and 20, are made to receive two rollers 22 and 23, which are provided with trunnions that are journaled and rotatably mounted in the ends of the boxes, the rollers being positioned to extend below the bottom of the boxes. A projection 24, extends from each end of the box beyond the rollers, forming a guideway space between them adjacent to the rollers, in each box. In this space a tapering hollow casing 24$^A$, extends loosely and slidably with its closed portion in bearing contact and rolling relation to the rollers. These hollow casings are provided with rectangular recesses 25, in which a tapering rectangular block of wood or of any other suitable material or metal 26, is fitted and arranged so that its lower surface will extend below the casing and bear on the surface of the disk. These boxes and casings are arranged to stand and register opposite each other on the opposite sides of the upper and lower surfaces of the disk close to the disk's outer edge. In the outer ends of the boxes, angle-shaped projecting lugs 26 and 27, are formed, that extend toward each other and form together an apertured lug, through which one end of a lever 28, extends loosely, and is bolted loosely to the lug by a bolt $28^A$, which passes loosely through the lugs and the lever. The adjacent end of the lever 28, is pivotally connected to the end of one arm of a crank lever 29, the opposite arm of which is journaled horizontally along the top of the frame 1, in boxes 30, the caps $30^A$ of which are secured against accidental displacement by a threaded screw $30^B$, which projects through a lug $30^C$ against the cap, a check nut $30^D$ being provided to lock the bolt against displacement. To the opposite end portion of this arm I secure one end of an arm 31, which projects from and normally stands at right angles to the frame of the feeder. The free end of this arm 31, is adapted to be struck intermittently by the tappet of a stamp mill, as will be explained hereinafter. The thickest end of the wedge casings extends toward the rear end of the machine, and lugs 32, are formed on them, that project toward the boxes 19 and 20, and through these lugs I form apertures 33, through which I extend loosely bolts 34, one end of which is threaded into the adjacent sides of the boxes; the opposite ends of these bolts project beyond the lugs and nuts 35, are threaded to them, and on them between the nut and the lugs springs 36, are mounted, which are normally held under expansive pressure enough to normally hold the wedges under pressure contact with the rollers, and consequently the wooden frictional surfaces in contact with the opposite sides of the disk, and the frictional pressure of the wedges, may be increased or diminished as desired, by adjusting the nuts 35. The opposite end of the rod 28, extends loosely through an aperture formed in a block 37, secured to the adjacent corner 2, of the frame, and its end is threaded, and a nut 38 is threaded to it. This nut is preferably provided with a handle $38^A$, on the free end of which a weight $38^B$ is formed, and intermediate of this nut and the frictional grip device of the disk, I secure a collar on the rod, and between this collar and the nut I mount on the rod an expansive spring 39, which is held under adjustable tension by the nut. This spring is made stronger or of greater resilient tension than the springs 36, so that when the arm 29 and rod 28 have been thrown back by a blow from the tappet on the arm 31, the said spring will throw the rod 28, forward again to its normal position, thus freeing the wedge plates, which will then be drawn forward beneath the rollers by their springs 36.

The operation is as follows: The feeder is positioned back of a stamp mill in position to feed ore to it, and it is arranged so that the tappet of the stamp mill will strike arm 31 at each of its vertical strokes, and the hopper is kept well supplied with ore. The stroke of a stamp mill tappet is a vertical stroke of a fixed distance, although it varies in the number of strokes per minute, depending on the character of ore being stamped. The length of the stroke imparted to the end of the arm may be regulated by screwing the nut 38, either on or off of the rod 28, which will either raise or lower the free end of the arm toward or from the tappet, and thus regulate the length of the stroke. The blows of the tappet on the end of the arm and the length of the stroke of the free end of the arm, are what governs the feed of the disk and of the ore out of the hopper into the feed plate disk, and this tappet stroke is imparted to the rollers and wedges to feed the disk step by step in the following manner: When the tappet strikes the free end of the arm, it throws it down, which jerks the rod 28 back against its spring 39, and as this rod is bolted to both of the roller boxes, and as the rollers are held normally in contact with the wedges by the springs 36, the rollers are thrown violently against the surface of the wedges and they are pressed tightly against the opposite sides of the frictional feed disk, instantly clamping it tightly between them, and at the very start of the backward movement, and throwing the wedges and consequently the feed disk and the ore feeding plate around a distance equal to the downward stroke of the arm, and the throw of the rod 28, which partial rotative movement feeds the ore out of the discharge chute of the hopper onto the plate disk between the guide plates, which, as the feed plate is rotated step by step, feeds the ore down its sloping surface between the guide plates to its edge, and discharges it into the mortar of the ore stamp. The instant the tappet strikes the free end of the arm, the rollers move up tight against the wedges, and they instantly grip and move the disk around the amount of their throw, but as this sudden backward jerk of the rod compresses the spring 39, the instant it is over the spring throws the rod forward, and the free end of the arm up, causing it to follow the tappet up on its up stroke. This forward throw of the rod also throws the rollers and their boxes forward, and as the springs 36 are made weaker than the spring 39, they yield under the forward jerk of the rod and rollers, while the wedges remain stationary for an instant, thus loosening the rollers from them, but the next instant the springs 36, which are compressed between the nuts 35, and the lugs of the wedges, force the wedges forward also, but as the rollers are not in engagement with them they are loose on the surface of the frictional disk, and slide along it against the rollers, thus bringing the rollers and wedges into operative relation for another feed stroke of the arm and rod 28. This intermittent step by step feed movement of the ore feeding disk, is repeated at from about twenty to about sixty strokes per minute, depending on the number of drops of the stamp per minute. Upon the front of the hopper, is secured a gate 40, which can be raised or lowered to regulate the discharge of the ore from the disk 9. The gate is held in position by pins or screws 41.

In Fig. 4, I illustrate a modification of the mechanism for operating the frictional grip device. In this modification I operate the feeder by belt instead of by the tappet of a stamp mill, and to this end I journal a shaft 43, in boxes 44, which are secured to the bottom cross pieces 3. One end of this shaft projects beyond the feeder, and a belt pulley 45, is secured on it. A cam 46, is also mounted on the shaft, below the rod 28, and on the rod 28 I secure a collar 47, and to this collar I pivotally secure a lever 48, intermediate of its ends. The upper end of the lever extends to and is pivotally secured to a side piece of the frame, and its lower end is free and is arranged to engage the face of the cam, and is held normally in engagement therewith by the spring 39. When a power operating belt is attached to the pulley and the shaft and cam are rotated, the cam pushes the lever back against the spring, and the spring moves the lever and rod forward; thus an intermittent reciprocal movement is imparted to the rod 28, which in the tappet operating mechanism is imparted to the frictional grip device, and to its disk and the ore feeding disk.

Having described my invention, what I claim as new and desire to secure by Letters Patent, is:

1. In an ore feeder, the combination of the frame, provided with floor rollers and an inclined vertical shaft at one end, with an ore feeding disk secured to said shaft, an ore hopper in said frame, having its discharge aperture resting close onto said disk and arranged to discharge thereon, ore guards arranged to guide the ore from said discharge aperture to the discharge edge of said ore feeding disk, a frictional disk secured to said shaft, a pair of roller supporting arms pivotally mounted on said shaft on opposite sides of said disk, a wedge between each roller and said frictional disk, and arranged to have a slight reciprocal movement of said rollers, resilient means for normally holding said rollers in engagement with said wedges, a reciprocating rod spring controlled in one direction of its movement, connected to said roller supporting arms, and means for moving said rod in the opposite direction of its reciprocal movement, as specified.

2. In an ore feeder, the combination with the frame, the inclined shaft journaled in said frame, the ore feeding disk secured on said shaft, the hopper arranged in said frame to discharge on said ore feeding disk, and the guide plates arranged to guide ore from said hopper to the discharge edge of said disk, of the frictional disk secured to said shaft, a pair of boxes pivotally secured to said shaft, on opposite sides of said frictional disk, rollers pivotally mounted in said boxes to project from the same, a guideway in each box adjacent to its roller, a wedge in each of said guideways, a rod secured to said boxes and extending loosely through said wedges, a spring pressure between the end of said rod and said wedges, a reciprocating rod spring controlled in one direction of its movement, connected to said boxes, and means for imparting an operative movement to said rod in the opposite direction of its movement, as specified.

In testimony whereof I affix my signature in presence of two witnesses.

HENRY EGGERS.

Witnesses:
G. SARGENT ELLIOTT,
BESSIE THOMPSON.